(12) United States Patent  (10) Patent No.: US 7,998,383 B2
Lee et al.  (45) Date of Patent: Aug. 16, 2011

(54) EMBLEM OF AUTOMOBILE PART AND METHOD OF MANUFACTURING THE SAME

(75) Inventors: Changwoo Lee, Gangwon-do (KR); Sangwoo Shim, Gangwon-do (KR); Hojin Lee, Gangwon-do (KR); Seungmok Park, Gangwon-do (KR)

(73) Assignee: Autoliv Development AB, Vargarda (SE)

( * ) Notice: Subject to any disclaimer, the term of this patent is extended or adjusted under 35 U.S.C. 154(b) by 314 days.

(21) Appl. No.: 11/473,932

(22) Filed: Jun. 23, 2006

(65) Prior Publication Data

US 2007/0228604 A1 Oct. 4, 2007

(30) Foreign Application Priority Data

Mar. 28, 2006 (KR) .................. 10-2006-0027782
May 26, 2006 (KR) .................. 10-2006-0047671

(51) Int. Cl.
*B29C 59/00* (2006.01)

(52) U.S. Cl. ........ 264/132; 264/129; 264/134; 264/139; 264/138; 264/145

(58) Field of Classification Search .................. 264/129, 264/132, 134, 139, 145, 138
See application file for complete search history.

(56) References Cited

U.S. PATENT DOCUMENTS

| 4,650,533 | A | * | 3/1987 | Parker et al. .................. 156/219 |
| 4,940,690 | A | * | 7/1990 | Skees ............................. 503/206 |
| 5,622,587 | A | * | 4/1997 | Barthelman .................. 156/251 |
| 5,800,661 | A | * | 9/1998 | Reis et al. ..................... 156/285 |
| 6,082,762 | A | | 7/2000 | Preisler et al. |
| 6,209,905 | B1 | * | 4/2001 | Preisler et al. ............. 280/728.2 |
| 6,367,361 | B1 | * | 4/2002 | Christensen et al. ............. 83/15 |
| 6,497,567 | B1 | * | 12/2002 | Eschenfelder et al. ........ 425/127 |
| 6,830,713 | B2 | * | 12/2004 | Hebrink et al. ................ 264/1.6 |
| 2005/0104338 | A1 | * | 5/2005 | Soderquist .................. 280/728.3 |

FOREIGN PATENT DOCUMENTS

| FR | 2827805 | 1/2003 |
| JP | 56118834 | 9/1981 |
| JP | 05286226 | 11/1993 |

* cited by examiner

*Primary Examiner* — Yogendra N Gupta
*Assistant Examiner* — John P Robitaille
(74) *Attorney, Agent, or Firm* — Brinks Hofer Gilson & Lione

(57) ABSTRACT

Provided is a method of manufacturing an emblem of an automobile part in which the emblem and the part are formed integrally. The method includes printing an emblem on a film wound up in a roll at predetermined intervals (S1), three-dimensionally forming the emblem-printed film (S2), cutting the three-dimensionally formed film using a cutter to obtain an emblem film (S3), inserting the cut emblem film into upper and lower halves of a mold (S4), and injecting a melted resin into the mold to integrally form the resin with the emblem film (S5).

13 Claims, 2 Drawing Sheets

EMBLEM OF AUTOMOBILE PART AND METHOD OF MANUFACTURING THE SAME

BACKGROUND OF THE INVENTION

1. Field of the Invention

The present invention relates to an emblem of an automobile part and a method of manufacturing the same, and more particularly, to an emblem of an automobile part, attached to an airbag, a hood top, a hubcap, a side trim, a gear knob, and so on, to represent a manufacturer of the automobile, and a method of manufacturing the same.

2. Description of the Prior Art

As is well known, an emblem is attached to a surface of a product or the exterior of the product to embed the product manufacturer into consumers' memory.

The emblem may be a geometric figure, a sign, a character, or some combination thereof for representing a company name, a group name, a company mark, a logo, and so on, to be used as a symbol for simply representing a company or a group.

Such an emblem is conventionally made of a plastic or metal material plated with chrome to stand out. The chrome plating is performed by electric plating, chemical plating, dipping plating, and so on. Electric plating and chemical plating will be briefly described below.

In order to perform electric plating, a plating bath containing copper sulfate solution is prepared, a power supply is prepared to supply current, a variable resistor is installed to supply an appropriate amount of current, and a cathode rod connected to the power supply is installed in the plating bath.

When power is applied to the cathode rod connected to a material to be plated, the cathode rod is negatively charged, and electrons discharged from the cathode rod are transmitted to copper ions $Cu^+$ yielding copper metal.

As a result, sulphuric acid ions $SO^-$ in the plating bath bond with copper atoms to generate a new copper sulfate in the sulfate solution so that copper sulfate is accumulated on a surface of the material to be plated at normal atomic intervals, thereby performing plating.

The electric plating method can be applied using various metals such as iron, cobalt, nickel, copper, zinc, ruthenium, silver, cadmium, gold, and so on. In addition, since the electric plating method can be used to bright-plate the surface of a product with a copper-nickel-chrome alloy, it may be applied to a product requiring anticorrosion and anti-abrasion properties.

In addition, in the chemical plating method, a non-conductive material such as plastic, fiber, paper, and so on is dipped in the plating solution, and then, the non-conductive material is plated. The chemical plating method further includes a degreasing process for removing organic materials stuck to the surface of the product to be plated by dipping the product in a degreasing bath, and an etching process for giving the surface of the product to be plated a fine roughness to improve adhesion of the plating by an anchoring effect and to make the surface of the product hydrophobic.

Then, the product passes through an activation process for forming a palladium and zinc nucleus at the roughness, and a re-activation process for completely removing elemental zinc from ionic zinc and palladium.

In addition, the product passes through a conversion process for plating the roughness formed by the etching process using palladium catalyst with nickel (Ni) metal particles to a small thickness to convert the non-conductive product into a conductive material, and a first brightening process for plating the nickel-plated part with sulphuric copper to make the surface smooth and shiny.

Then, the product passes through a second brightening process for depositing a semi-bright nickel, a bright nickel, and a duralumin nickel in a two or three-layered structure to provide electro-deposition and high anticorrosion characteristics, and a chrome plating process for plating the deposited surface with chrome (Cr) to a thickness of 0.1~0.5 μm to provide an anti-corrosion property and durability.

Next, the product passes through a cleaning process for cleaning the surface of the plated product to remove stains stuck to the surface, and a drying process of moving the cleaned product using a moving carrier and drying the product using a hot air blower.

An emblem formed by the above method is attached to a hood top, an airbag, and so on, of an automobile. In particular, the emblem attached to the airbag is attached to the surface of a cover of the airbag, which is injection-molded and formed of plastic. In a collision of the automobile, an inflator instantly combusts a gas generating agent such as sodium nitride to inflate the airbag using the resulting nitrogen gas, and at this time, the emblem may separate from the air bag cover.

As a result, the emblem separated from the airbag may damage a passenger. In addition, since the airbag has a tear line formed at the airbag cover to instantly discharge the airbag when the airbag is deployed, the need to obtain an area for attaching the emblem makes it difficult to design the tear line.

Further, since chrome, a heavy metal, is used to make the emblem shiny, there is potential for environmental contamination such as water or soil contamination. Moreover, since an adhesion process for adhering the emblem to the airbag cover should be added, it is likely to decrease productivity as well as working performance of the product.

SUMMARY OF THE INVENTION

An object of the present invention is to provide an emblem of an automobile part and a method of manufacturing the same capable of integrally forming the emblem with an automobile part to prevent separation of the emblem from the part.

An aspect of the invention provides a method of manufacturing an emblem including: printing an emblem on a film wound up in a roll at predetermined intervals (S1), three-dimensionally forming the emblem-printed film (S2), cutting the three-dimensionally formed film using a cutter to obtain an emblem film (S3), inserting the cut emblem film into upper and lower halves of a mold (S4), and injecting a melted resin into the mold to integrally form the resin with the emblem film (S5).

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Hereinafter, exemplary embodiments of the present invention will be described with reference to the accompanying drawings.

Figure 1:
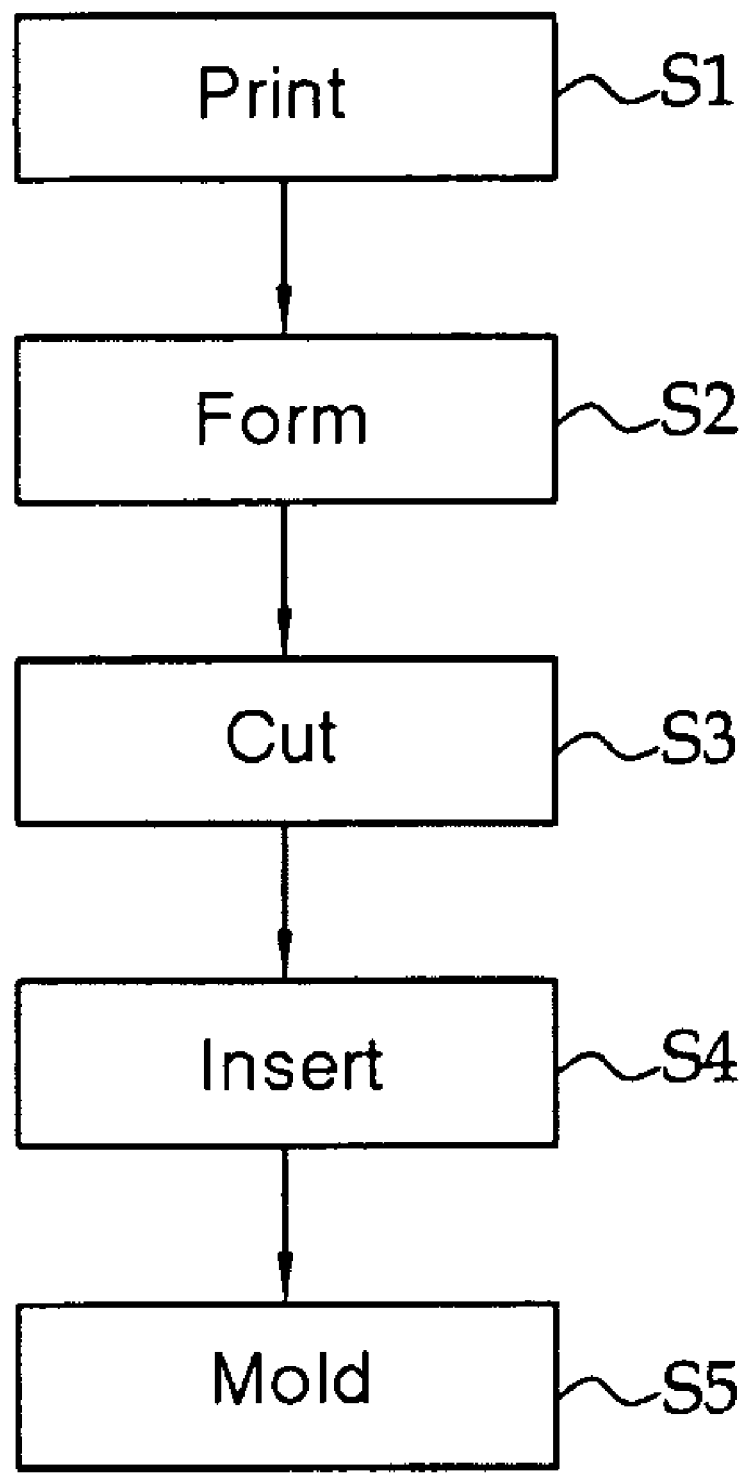
FIG. 1 is a flowchart showing a method of manufacturing an emblem in accordance with the present invention.
Figure 2:
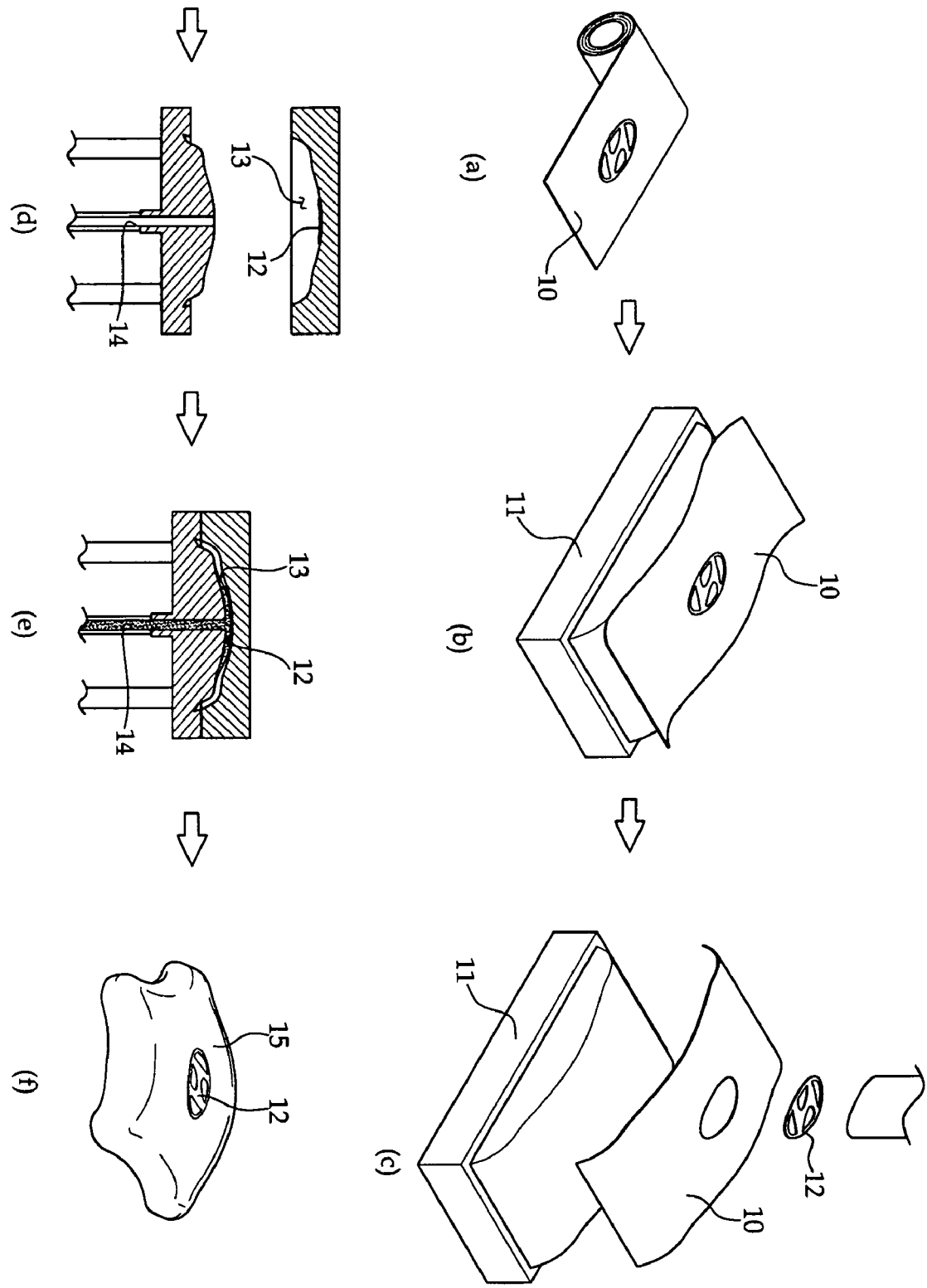
FIG. 2 is a view for explaining a method of manufacturing an emblem in accordance with the present invention.

FIG. 1 is a flowchart showing a method of manufacturing an emblem in accordance with the present invention, and FIG. 2 is a view for explaining a method of manufacturing an emblem in accordance with the present invention.

As shown in FIG. 1, a method of manufacturing an emblem in accordance with the present invention includes printing an emblem such as a company logo or mark (S1), three-dimensionally forming an emblem-printed film (S2), cutting the three-dimensionally formed film (emblem film) (S3), inserting the cut emblem film 12 into a cavity 13 of upper and lower halves of a mold (S4), and injecting a resin into the cavity 13 of the mold having a nozzle 14 to integrally form an airbag cover 15 (S5).

First, the emblem, such as a company logo, a mark, a sign, and so on, is printed on a film in the printing step S1. At this time, the film may be a roll of polyethylene terephthalate (PET) film 10 having emblem designs formed thereon at predetermined intervals for the following step of cutting (see FIG. 2A).

Of course, it is also possible to print the emblem designs on a sheet of PET film having a predetermined size, and a polycarbonate (PC) film is also usable.

The print operation may be performed using a gravure printing machine or a semi-automatic printing machine having a gravure rotary press. Since the machine can perform multi-colored printing, it is also possible to print the emblem with various colors.

After the printing step S1, an adhesive agent is applied on one surface of the PET film 10 to adhere the PET film to a substrate 11 having the same with as the PET film 10. Then, thin transparent protection films (not shown) are lightly attached to both sides of the PET film 10 to allow the PET film 10 to be readily separated from the substrate 11.

Preferably, the substrate 11 is formed of a synthetic resin, which can be readily deformed by heat, pressure or vacuum using a press, a vacuum forming device, and so on.

When heat, pressure or vacuum is applied to the PET film-attached substrate 11, the substrate 11, and along with it the PET film 10, are deformed into a predetermined three-dimensional shape. That is, the forming step S2 for deforming the printed emblem part only is performed (see FIG. 2b). The PET film 10 is deformed to have the same curved surface as an airbag cover formed by the following molding step S5.

When the PET film is given a three dimensional shape in the forming step S2, it is also possible to form the PET film to have an embossed surface rather than a flat surface.

Next, the PET film 10 is conveyed to the cutter (not shown) which cuts out only the emblem design using a cutting blade (S3) (see FIG. 2C).

After obtaining the emblem film 12 in the cutting step S3, the emblem film 12 is inserted into the cavity 13 of the upper and lower halves of a mold of an injection molding apparatus (not shown) (S4). The emblem film 12 is inserted into the cavity 13 manually or automatically using equipment such as a robot arm and mounted opposite to the nozzle 14 in the cavity 13 (see FIG. 2D).

Here, an adhesive or weak bonding agent is applied in the cavity 13 to temporarily fix the emblem film 12.

Then, the cavity 13 between the upper and lower halves of a mold is closely pressed. Next, the injection molding apparatus (not shown) presses particles of resin in a hopper by rotating a screw, or heats the resin, and then supplies the resulting melted resin into the cavity 13 through the nozzle 14 (see FIG. 2E).

Continuously filling the cavity 13 with the melted resin, the molding step S5 is performed to form the airbag cover 15 having the same shape as the cavity 13.

Discharging the formed airbag cover 15 from the cavity 13, the manufacture of the airbag cover 15 is completed as shown in FIG. 2F.

In addition, a protection film may be attached to a surface of the emblem integrally formed with the airbag cover formed by the above steps, and a brightener or colored paint may be applied using a spray gun to improve the surface of the emblem.

Further, it is also possible to form a hubcap by inserting the emblem film 12 manufactured by the printing step S1, the forming step S2, and the cutting step S3, into a hubcap molding apparatus.

Of course, it is also possible to apply the present invention in forming an engine bay, a gear knob, a key fob, and so on.

As can be seen from the foregoing, since an emblem is inserted into a cavity of a mold and integrally formed with a molded product, it is possible to prevent separation of the emblem from the product, thus preventing driver/passenger injury by the emblem on collision of an automobile. In addition, since the emblem is manufactured without a plating process using a heavy metal such as chrome, it is possible to prevent environmental contamination. Further, a process of attaching the emblem is omitted to reduce manufacturing cost.

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

What is claimed is:

1. A method of manufacturing an emblem and a part with the emblem integrally molded thereto, the method comprising:
    printing indicia on a surface of a film;
    attaching the film with the indicia thereon to a substrate;
    plastically deforming the substrate and the film attached thereto by applying heat and pressure to the substrate, wherein a deformed film portion with the indicia thereon is provided with a three-dimensional configuration matching that of the plastically deformed substrate and wherein the three-dimensional configuration of the deformed film also matches that of the part;
    removing the deformed film portion with the indicia thereon from the deformed substrate after it has been provided with the three dimensional configuration such that only the deformed film portion with the indicia thereon has no backing substrate;
    cutting the indicia of the deformed film portion with the indicia thereon from other portions of the deformed film portion to obtain an emblem film;
    inserting the emblem film into a mold; and
    injecting a melted resin into the mold to form the part, wherein the emblem film is integrally formed with the part and the indicia is viewable on the part.

2. The method according to claim 1, further comprising, after the printing, adhering a transparent protective film on the film.

3. The method according to claim 1, wherein the film is formed of polyethylene terephthalate (PET).

4. The method according to claim 1, wherein the film is formed of polycarbonate (PC).

5. The method as in claim 1, further comprising:
    applying an adhesive to the emblem film to temporarily secure it to the mold prior to the injection of the melted resin.

6. The method as in claim 1, wherein the part is an airbag cover.

7. The method as in claim 1, further comprising:
applying a transparent protective film to the film, the transparent protective film allowing the film to be removed from the substrate.

8. The method as in claim 7, further comprising:
applying an adhesive to the emblem film to temporarily secure it to the mold prior to the injection of the melted resin.

9. The method as in claim 8, wherein the part is an airbag cover.

10. The method as in claim 1, wherein the indicia is printed on the film at predetermined intervals.

11. The method as in claim 10, further comprising:
applying a transparent protective film to the film, the transparent protective film allowing the film to be removed from the substrate.

12. The method as in claim 11, further comprising:
applying an adhesive to the emblem film to temporarily secure it to the mold prior to the injection of the melted resin.

13. The method as in claim 12, wherein the part is an airbag cover.

* * * * *